Sept. 9, 1969 W. A. REIMER 3,466,629

REUSABLE DATA PLANES FOR MECHANICALLY ALTERABLE MEMORY SYSTEMS

Filed June 27, 1966 3 Sheets-Sheet 1

INVENTOR.
WILLIAM A. REIMER
BY Spencer E. Olson
ATTY.

REUSABLE DATA PLANES FOR MECHANICALLY ALTERABLE MEMORY SYSTEMS

Filed June 27, 1966 3 Sheets-Sheet 2

Sept. 9, 1969 W. A. REIMER 3,466,629

REUSABLE DATA PLANES FOR MECHANICALLY ALTERABLE MEMORY SYSTEMS

Filed June 27, 1966 3 Sheets-Sheet 3

United States Patent Office
3,466,629
Patented Sept. 9, 1969

3,466,629

REUSABLE DATA PLANES FOR MECHANICALLY ALTERABLE MEMORY SYSTEMS

William A. Reimer, Wheaton, Ill., assignor to Automatic Electric Laboratories, Inc., Northlake, Ill., a corporation of Delaware Filed June 27, 1966, Ser. No. 560,415
Int. Cl. G11b 5/02
U.S. Cl. 340—174 5 Claims

ABSTRACT OF THE DISCLOSURE

Reusable data planes for use in a mechanically alterable memory have slits at bit locations which define a plurality of strips hinged to the plane and selectively movable between a first position to code the corresponding bit location to a binary "one" and a second position to code the corresponding bit location to a binary "zero" whereby the coding of the data planes may be altered for reuse by repositioning the strips.

This invention relates to mechanically alterable memory systems and more particularly to improved reusable data planes for use in mechanically alterable memory systems.

A mechanically alterable solenoid array memory system is described by J. M. Donnelly, K. E. Larabee, and B. J. Rekiere in copending patent application Ser. No. 379,941, filed July 2, 1964, and assigned to the same assignee as the present invention, wherein a data store comprises a plurality of data planes, each having a plurality of aligned apertures therein, and a plurality of elongated solenoids, each of which extends through respective aligned ones of said apertures. Each data plane comprises two portions, a driving portion and a storage portion. Likewise, the solenoids are groups into two categories, drive solenoids and sense solenoids. A plurality of single turn printed loops, hereinafter called minor loops, are carried on each data plane. On the storage portion of a data plane the minor loops are arranged to encircle in signal transfer relationship respective ones of said sense solenoids in one direction or the other. On the drive portion of a data plane, a single minor loop encircles a unique one of said drive solenoids in signal transfer relationship; therefore, the number of data planes is equal to the number of drive solenoids. The single drive minor loop is serially connected with the plurality of data storage minor loops to form a major loop. Those storage loops which encircle their corresponding sense solenoids in a first direction represent a ONE and those sense loops which encircle their corresponding solenoids in the opposite direction represent a ZERO. To read data from a particular data plane, the drive solenoid which corresponds to that plane is energized and acts as a transformer primary to its associated drive minor loop which acts as a secondary and establishes a current flow through the serially connected major loop. Each storage loop which is a part of the major loop acts as a primary winding to its corresponding sense solenoid. The signals sensed by the sense solenoids have a polarity dependent on the direction of encirclement and represent the ONES and ZEROS of the stored data.

Another type of mechanically alterable memory system is described in my U.S. Patent 3,139,668 which is also assigned to the same assignee as the present invention, wherein a length of "twistor" material, which may be of the type described in the November 1957 issue of the Bell System Technical Journal by A. H. Bobeck, volume XXXVI, pp. 1319–1340, is located between a current bearing solenoid and a data plane which comprises a copper conducting sheet acting as a virtual solenoid. The data plane is not directly electrically connected to either the solenoid or to the "twistor" material. According to the principle of the virtual solenoid, flux linkages between the conducting sheet and the current generating solenoid aid in strengthening the magnetic field on the "twistor" material positioned between the two elements. This added strength is the result of eddy currents induced by time varying flux linkages between the current carrying conductor and the conducting sheet. On the other hand, the strength of this added magnetic field may be reduced by removing the conducting material from the portion of the sheet located immediately above the current carrying conductor.

When a length of "twistor" is placed in the magnetic field between the data plane and the solenoid, a sufficient solenoid current will set up a magnetic field strong enough to change the magnetic state of the "twistor" material. However, this same current will not cause a change of state if the conducting material has been removed from the sheet above the length of "twistor" material. Therefore, binary coding of the "twistor" memory unit is accomplished by selectively removing portions of the conducting material from the data plane at specified locations.

The data planes for use in mechanically alterable memory systems as just described have a common advantage in that no physical connection to the remainder of the system is required. Data may be changed by removing a plane from the memory array and replacing the plane with one having different information content. However, unless the data content of a removed plane is to be saved for future use, and at the same address, the removed plane is useless, and is usually discarded. This adds to the operating cost of the memory system. Further costs are incurred in the case of the aforementioned data planes if the semiconductor components associated therewith are discarded with the plane, or if a salvage operation is required to save such components.

It is, therefore, the primary object of the present invention to provide new and improved reusable data plane arrangements for mechanically alterable memory systems.

It is another object of the invention to provide improved reusable data planes, the information content of which may be altered on a bit basis.

Through the above objects, it is a further object of the invention to reduce the operating costs of mechanically alterable memory systems.

Briefly, a reusable data plane, according to the invention comprises a sheet having conductive portions at least at the bit locations of the data plane and slits defining therein at each location a strip partially severed from and partially hinged to the sheet and selectively movable, by flexing, between a first position, representing one binary state, and a second position, representing the other binary state. to impart the desired state to each bit location.

Referring first to data planes for solenoid array memory systems, the data planes of the prior art were produced as master sheets comprising a flexible base, such as Mylar film, and carrying a printed conductor, usually copper, having minor loops which completely encircled the solenoid accepting apertures. The master sheets were encoded by scraping away or punching out a portion of the minor loops on either side of the apertures. However, as mentioned previously, whenever the coding was to be altered the replaced data plane was usually discarded.

A reusable data plane has been disclosed in a patent application, Ser. No. 548,110, filed in the United States May 6, 1966, by M. J. Kelly and B. J. Rekiere and assigned to the assignee of this application. This data plane, produced as a master sheet, comprises a flexible base having printed conductors thereon. The conductors are discontinuous adjacent the solenoid accepting apertures, and code strips carrying conductive patterns are removably affixed to the data planes to complete certain conductive paths and thereby provide the desired coding.

According to the present invention, a master sheet also comprises a flexible base having a printed conductor thereon; however, prior to coding, the conductor passes along one side of all of the solenoids in the memory array. Slits in the base adjacent each aperture define a strip partially severed from and partially hinged to the base. A minor loop of the conductor extends onto each strip and partially encircles the solenoid accepting aperture. Whenever a code, other than that which is initially printed, is required, the strip containing the minor loop is folded over and creased along the center line of the aperture, thereby moving the conductor path from one side of the solenoid to the other, changing the coding at the particular bit location.

Referring now to data planes for twistor memory systems, the data planes of the prior art were produced as a flexible base, such as Mylar film with a layer of copper adhesively bonded thereto. The copper layer, initially coded all the bit locations to one binary state, and the coding was changed by removing the copper from the base at the desired bit locations.

According to the present invention, a master sheet also comprises a flexible, copper clad base; however, both the base and the copper layer are slit at each bit location defining copper coated strips cut free from the base on three sides and hinged to it by the Mylar base material on the remaining side. The coding required at each bit location is obtained by leaving the copper strip over the bit location to represent one binary state or by folding the strip back against the base, to temporarily remove the copper from the bit location, to represent the other binary state.

Other objects and features of the invention will become apparent and the invention will be better understood from the following description taken in conjunction with the accompanying drawings, in which.

Figure 1:
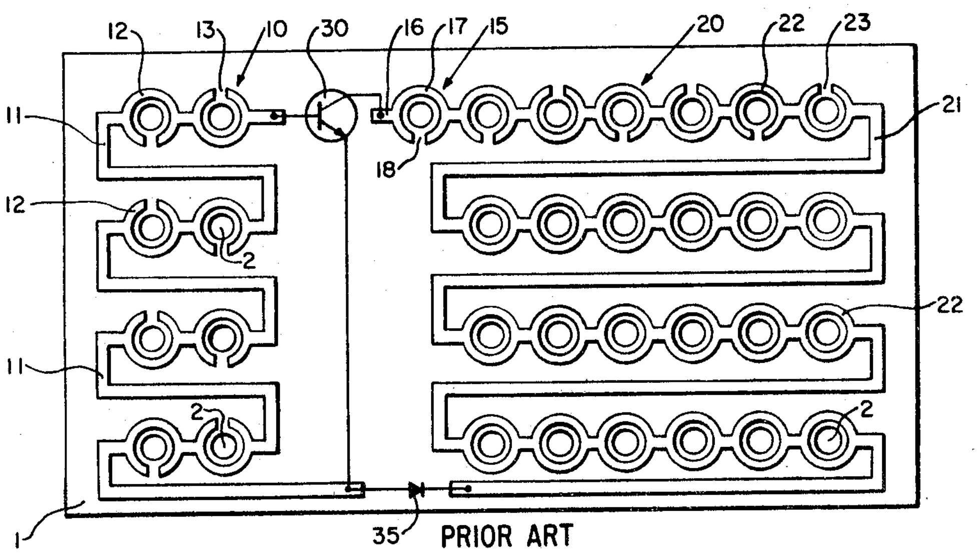
PRIOR ART FIG. 1
FIG. 1 is a schematic representation of a data plane of the prior art for a mechanically alterable solenoid array memory, shown partially encoded.

With reference to data planes for solenoid array memory systems, the prior art of FIG. 1 shows a data plane of the connectionless type comprising a base 1 having a plurality of apertures 2 therein, and carrying an address portion 10 including conductor 11 and minor loops 12, a drive portion 15 including conductor 16 and minor loop 17, and a storage portion 20 including conductor 21 and minor loops 22. The minor loops 12, 17 and 22 are encoded adjacent each aperture to encircle their respective solenoids (not shown) in one direction or the other. The address major loop comprises conductor 11 connecting minor loops 12 in series with the base-emitter circuit of transistor 30. The storage major loop comprises minor loops 17 and 22 connected in series with the collector-emitter circuit of transistor via conductors 16 and 21 and diode 35.

Encoding of the data plane is generally performed by scraping or punching away portions of the conductive patterns of loops 12, 17 and 22 to include within (or exclude from) the solenoids their respective major loops as shown by references 13, 18 and 23 and thereby selectively encircle the solenoids in one direction or the other. Attention is invited to FIG. 6, which shows the storage portions of two, one-bit data planes 21–22 and 121–122 and a sense solenoid 40 carried on a support 39. It can be seen that like currents in the major loops of these planes will cause opposite polarity output signals at the terminals of solenoid 40.

Figure 2:
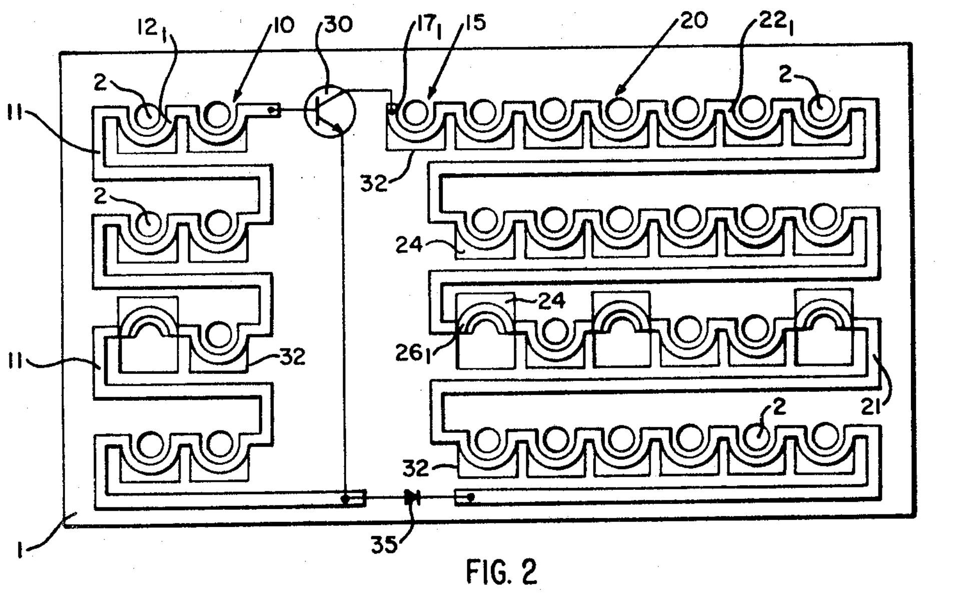
FIG. 2 is a schematic representation of an embodiment of the invention showing a partially encoded master data plane for a solenoid array memory.

Referring to FIG. 2, an embodiment of the invention is shown wherein a master data plane comprises a base 1 of flexible insulating material, such as Mylar film, having a plurality of apertures 2 therein at the bit locations. The data plane also comprises an address portion 10, a drive portion 15 and a storage portion 20 which are similar to the corresponding portions of FIG. 1.

The conductors as well as the minor loops in the address portion, the drive portion and the storage portion of the data plane are printed on the base using techniques known in the art for providing flexible printed conductors. Prior to coding, the minor loops $12_1$, $17_1$, and $22_1$, all pass along one side of the solenoid accepting apertures 2.

Slits 32 are provided in the base adjacent each aperture to facilitate coding of each bit location. The slits define a rectangular code strip at each location severed from the base on three sides and flexibly hinged to the base on the other side. The strip at each aperture carries the corresponding minor loop.

Each minor loop initially partially encircles the corresponding solenoid accepting aperture in one direction to represent one binary state, and, when a code strip such as 24 is folded over onto the base, the respective minor loop $26_1$, will be moved so as to partially encircle the aperture in the opposite direction to represent the other binary state.

It should be evident from the foregoing that the coding provided by the data plane described can be changed on a bit basis by merely moving the code strip at the bit location when re-coding is required.

Figure 3:
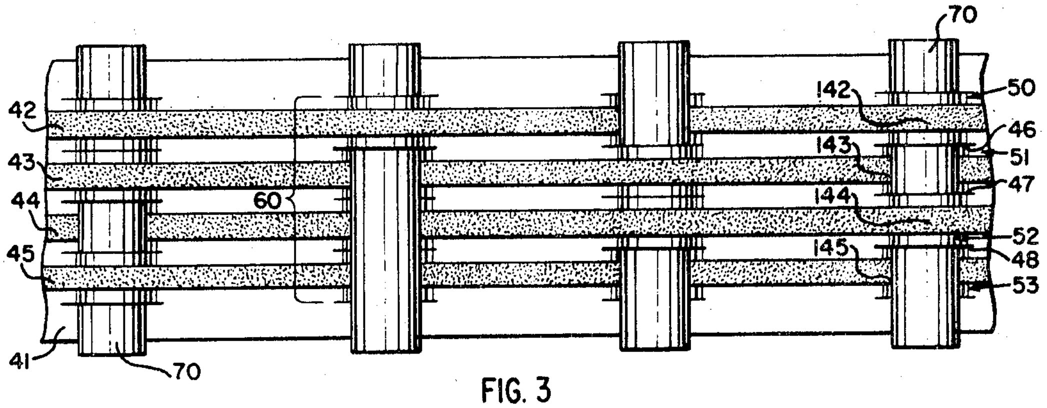
FIG. 3 is a schematic representation of another embodiment of the invention showing a portion of a master data plane for a solenoid array memory.
Figures 4, 5, 6:
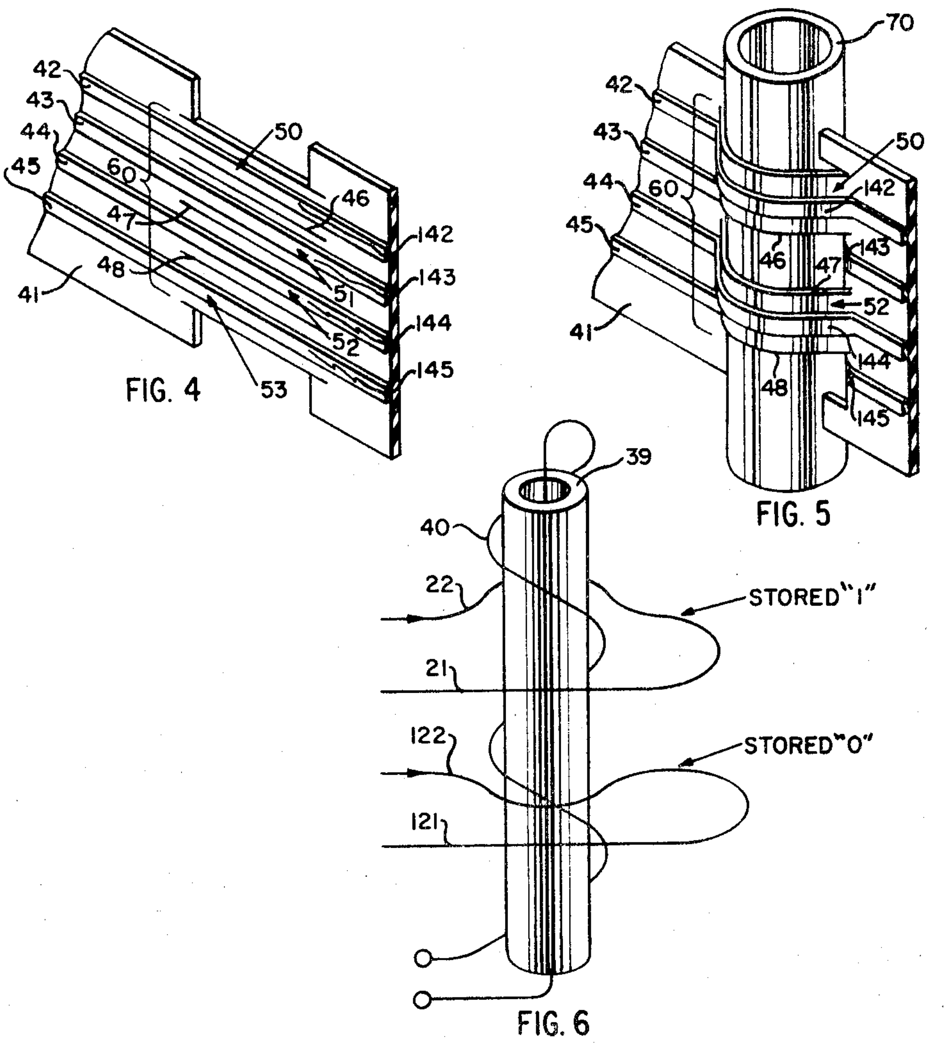
FIG. 4 is an isometric view of a portion of a data plane according to FIG. 3 showing the details of an uncoded data plane.
FIG. 5 is similar to FIG. 4 and shows the data plane coded.
FIG. 6 is a schematic representation of the bipolar coding technique.

Referring now to the partial views of another embodiment of the invention, shown in FIGS. 3, 4 and 5, a master data plane comprises a base 41 of a flexible insulating material, such as Mylar film carrying parallel printed conductors 42, 43, 44 and 45. The conductors are spaced apart from one another and extend longitudinally of the base.

The base has groups of slits 60 extending between adjacent conductors at bit locations. The strips in each group define generally rectangular code strip sections 50, 51, 52 and 53 severed from the base on two sides and hinged to the base on the other two sides. Each strip section is flexibly movable perpendicularly in two directions away from the surface of the base to permit the binary coding of each bit location. A conductor portion, such as 142 which corresponds to a minor loop, extends onto each strip section and is movable therewith.

Referring to FIG. 5, strip sections 50 and 52 have been flexed away from the surface of the base in one direction to a first position while strip sections 51 and 52 have been flexed away from the surface of the base in the opposite direction to a second position. When the strip sections are moved perpendicular to the base, an elongated passage is provided which extends generally perpendicular to the conductors between the strip sections at the first position and those at the second position. A hollow tube 70 of insulating material is inserted into the passage to maintain the strip sections at their respective positions and to receive the solenoids (not shown) of the memory unit, thereby appropriately positioning the data plane respective to the solenoids.

Consequently, conductor portions, or minor loops, 142 and 144 partially encircle the tube, and the solenoids when present, in one direction to represent coding in one binary state, while conductor portions 143 and 145 encircle the tube in the opposite direction to represent coding in the other state, so that by virtue of the position of the strip relative to the tube-passage, the desired coding can be imparted to each bit location.

To change coding the tube(s) is removed and the conductor bearing strips involved in the change are flexed to pass on the other side of the tube when it is reinserted.

The technique disclosed herein may also be applied to data planes which are not of the connectionless card type. Such data planes comprise only the storage portion of the data planes illustrated herein, the major loop of said storage portion being connected to and driven by the electronic driving apparatus of the data system.

Figure 7:
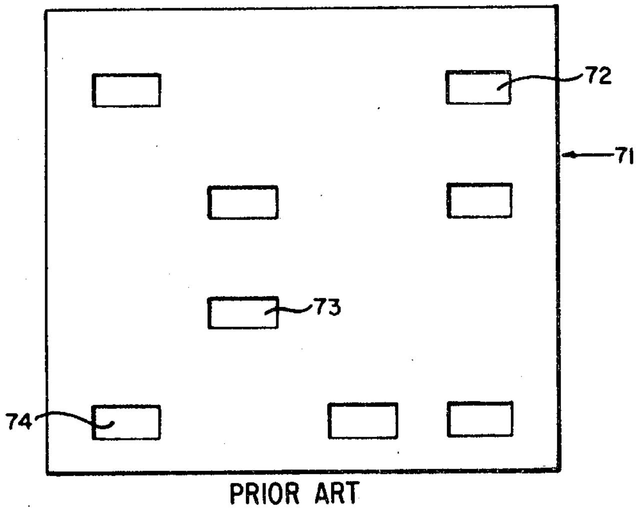
PRIOR ART FIG. 7
FIG. 7 is a schematic representation of a data plane of the prior art for a twistor memory.

FIG. 7 is an illustration of a data plane of the prior art for another type of mechanically alterable memory system. The data plane, for use with a "twistor" memory, comprises a copper-clad base 71 having openings 72, 73, and 74 where the copper conducting material has been removed from the data plane at predetermined bit locations. The "twistor" memory is coded to one binary state or the other as a function of the presense or absence of conducting material at bit locations.

Figure 8:
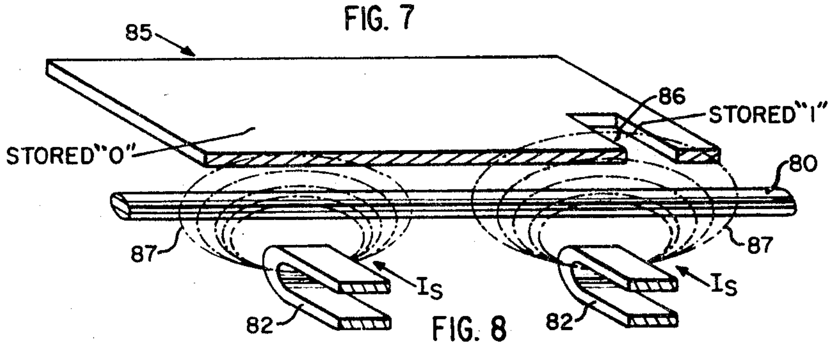
FIG. 8 is a diagrammatic illustration, in schematic form, of a "twistor" segment, solenoids and a data plane.

Attention is now directed to FIG. 8 which is a diagrammatic illustration in schematic form of a "twistor" segment 80, solenoids 82 and a conducting sheet, or data plane 85. In this arrangement, the data plane 85 extends over first and second solenoids 82 and the segment of "twistor" material 80 lies between the data plane and the solenoid. It will be noted that the conductive material has been punched out of the data plane above the second solenoid. Under these conditions, the solenoid current magnitude and rise time and the dimensions of the opening 86 may be such that the field 87 generated under the opening at the second solenoid will be insufficient to switch the "twistor" segment at that location, while the field 87 under the intact portion at the first solenoid will cause the "twistor" segment at that location to switch. Consequently, coding of a "twistor" memory can be accomplished by making openings in the conducting sheet at specified locations.

Figures 9, 10:
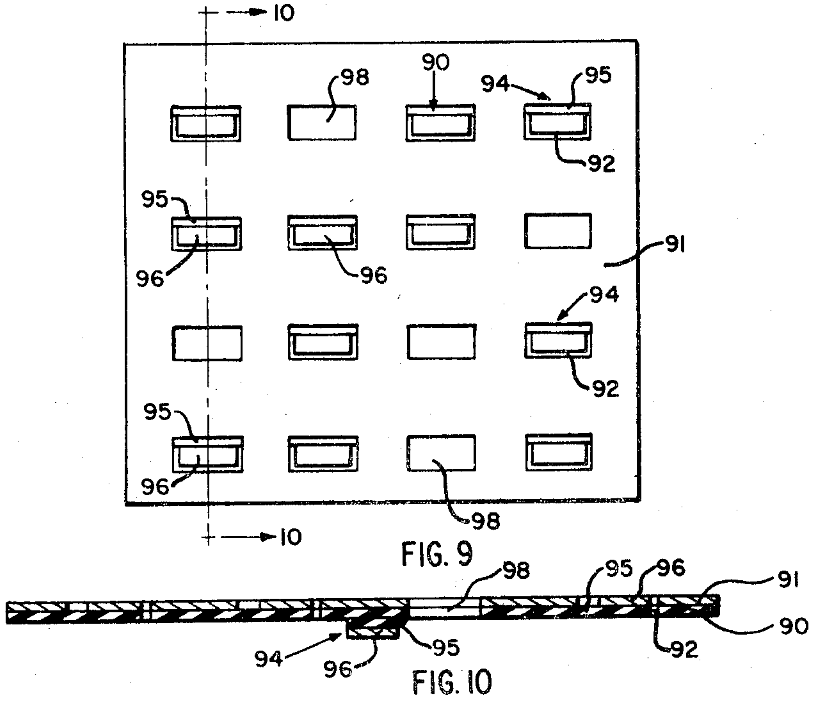
FIG. 9 is a schematic representation of an embodiment of the invention showing a "twistor master" data plane.
FIG. 10 is a sectional view taken along 10—10 of FIG. 9.

Referring to FIGS. 9 and 10, an embodiment of the invention is shown whereby a master data plane for a "twistor" memory system comprises a base 90 of flexible, insulating material, such as a Mylar sheet, which has a layer of conductive material 91 adhesively bonded to it. The data plane has slits 92 at each bit location defininig generally rectangular conductor bearing code strips 94 severed from the data plane on three sides and hinged to it, by means of the flexible base material on the fourth side 95. The conductive material may be removed, for instance by chemical etching, from the hinged side 95 of each strip to facilitate flexible movement of the strip. Initially, conductor bearing code strips are provided over all bit locations coding them to one binary state. To code any of these locations to the other state, the code strip is temporarily moved away from these locations such as 98 by folding the strip back onto the base between bit locations. Further changes in the coding are accomplished by simply moving the code strip to the position required.

From the above description it will be evident that the present invention has provided reusable data planes for mechanically alterable memory systems and that the information content of each data plane can be altered by moving the code strips at predetermined bit locations to the required positions. The flexible base and flexible conductive material of each data plane facilitates the flexure of the code strips and the provision for a code strip at each bit location permits alteration of the data planes on a bit basis.

What is claimed is:

1. A coding arrangement for a mechanically alterable memory as claimed in claim 5 wherein certain ones of said strips are maintained within said plane and the remainder of said strips are folded back onto said plane.

2. A data plane for coding a mechanically alterable memory; said data plane having a plurality of bit locations and comprising:

a sheet of insulating material having apertures at said bit locations of said data plane;

slits in said sheet adjacent said apertures defining therein, at each said location, a strip partially severed from and partially hinged to said sheet and selectively movable, by flexing, between a first position, representing one binary state, and a second position, representing the other binary state;

and an electrical conductor carried by said sheet having a loop portion at each said location extending onto said strip and partially encircling the corresponding aperture in a first direction when said strip is in said first position and in a second direction when said strip is in said second position thereby imparting the desired state to said bit location.

3. A data plane comprising:

a sheet of insulating material having a plane surface;

a plurality of parallel conductors carried by said sheet, spaced apart from one another and extending longitudinally thereon;

groups of slits in said sheet extending between adjacent ones of said conductors and generally parallel thereto, said group being aligned generally perpendicular to said conductors, and said slits defining in said sheet, at corresponding bit locations of said data plane, conductor bearing strip sections, each partially severed from and partially hinged to said sheet and selectively movable, by flexing, in a direction normal to said plane surface between a first position, representing one binary state, and a second position, representing the other binary state, certain ones of said conductor bearing strip sections moved to said first position and the remainder of said strip sections moved to said second position whereby an elongated passage is provided which extends generally perpendicular to said conductors between the strip sections at said first and second positions, the conductors borne by the strip sections at said first position partially encircling said passage in a first direction and the conductors borne by the strip sections at said second position partially encircling said passage in a second direction, thereby imparting the desired state to each said bit location.

4. A data plane as claimed in claim 3 and including a hollow tube of insulating material positioned in said passage maintaining said strip sections at said positions.

5. A coding arrangement for a mechanically alterable memory with a plurality of solenoids and a reusable data plane having bit locations and conductive portions at the last-mentioned locations, which are inductively linked with said solenoids in a manner depending on the coding of said data plane at the individual bit locations, and said data plane also having slits defining in said plane at each bit location, a strip of conductive material partially severed from and partially hinged to said plane, to permit said strip to be selectively moved, by flexing, between a first position to code the corresponding bit location to a binary one, and a second position to code the corresponding bit location to a binary zero, whereby the coding of said data plane may be altered for reuse by repositioning said strips.

References Cited

UNITED STATES PATENTS 3,319,234 5/1967 Brette ______________ 340—174

FOREIGN PATENTS 1,156,747 5/1958 France.

BERNARD KONICK, Primary Examiner

G. M. HOFFMAN, Assistant Examiner